Nov. 23, 1965   L. J. NOWAK, JR   3,219,132
AUTOMATIC RECEPTACLE FILLING MACHINE
Original Filed March 30, 1959   14 Sheets-Sheet 1

INVENTOR.
Leon J. Nowak Jr.,
BY Parker & Carter
Attorneys.

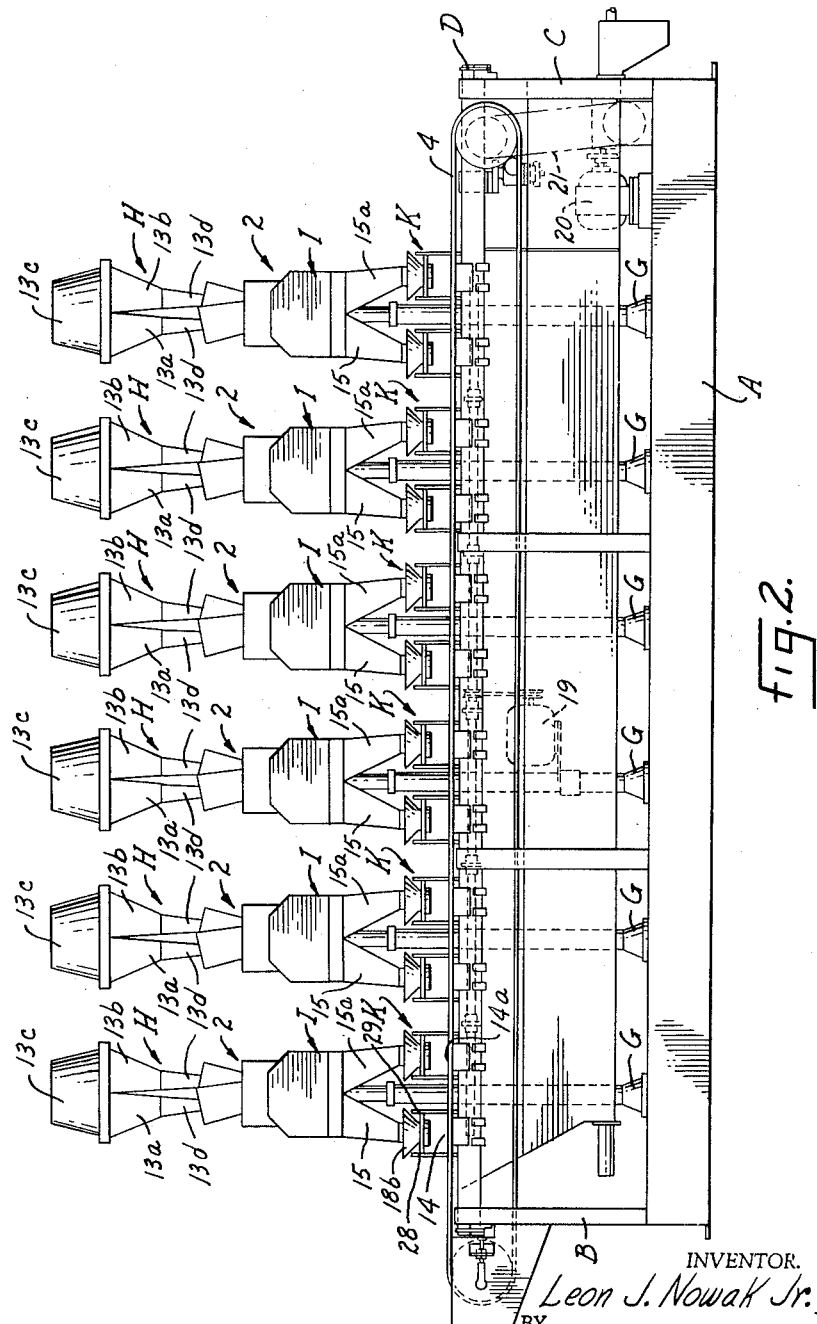

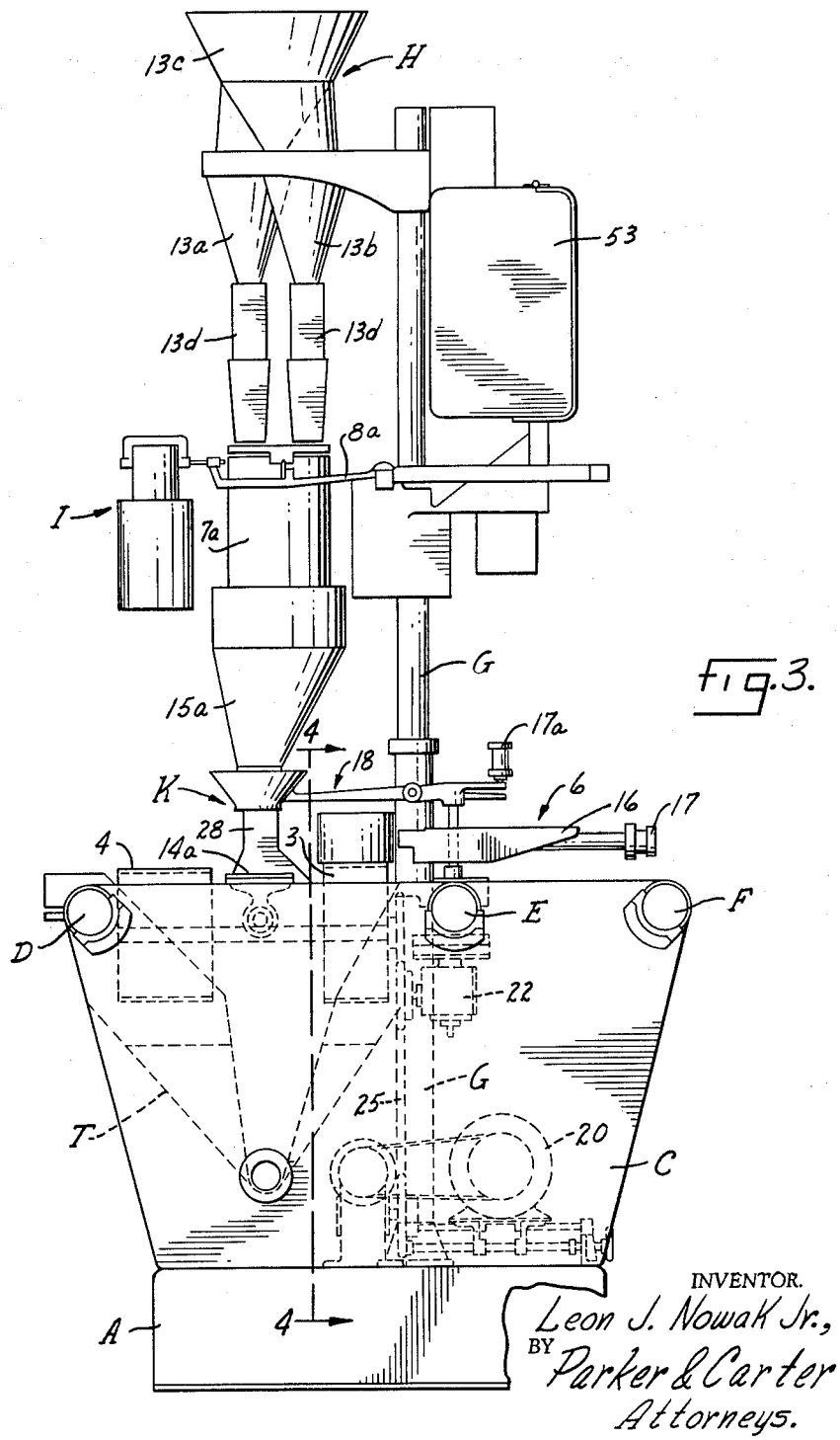

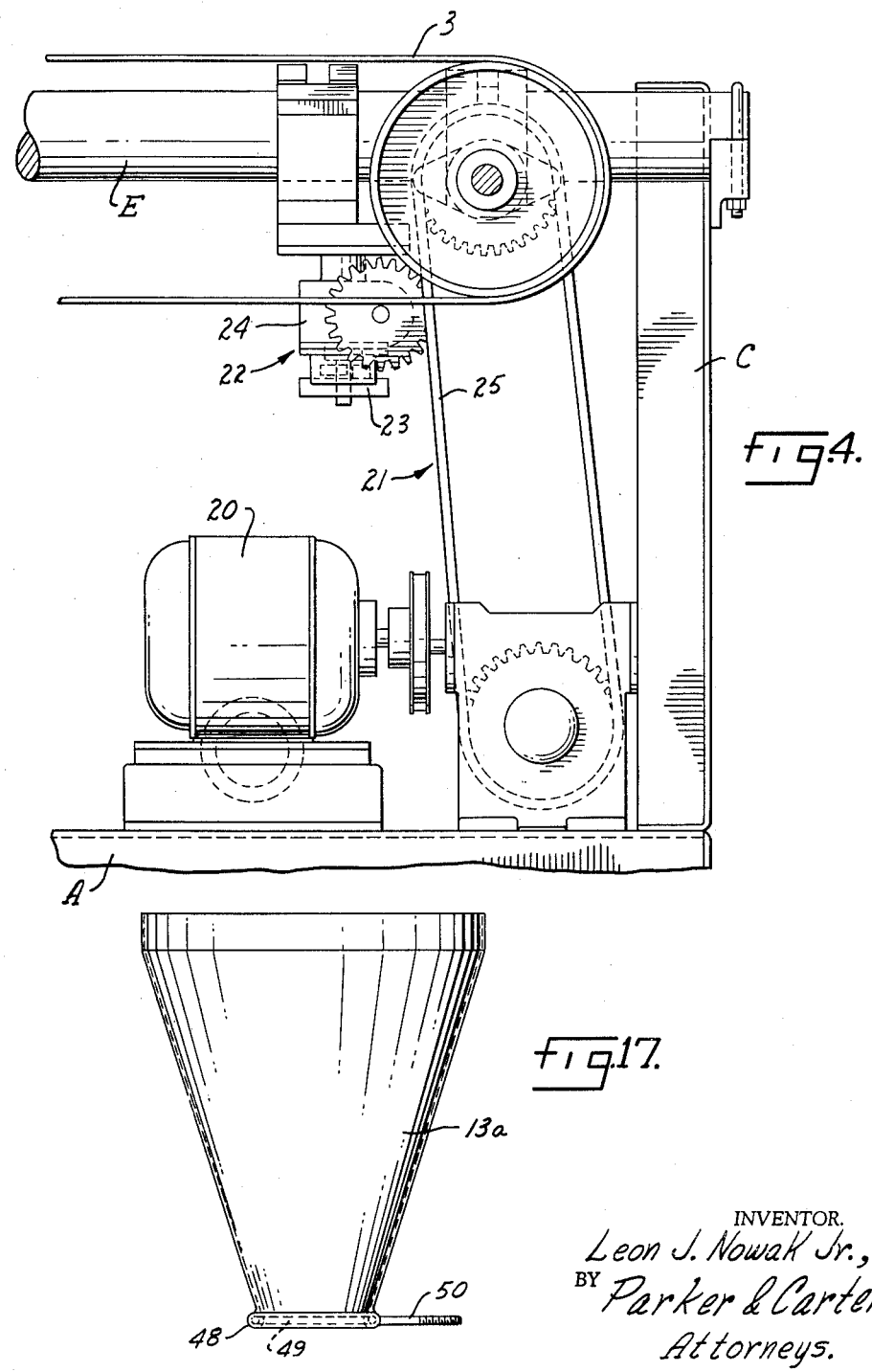

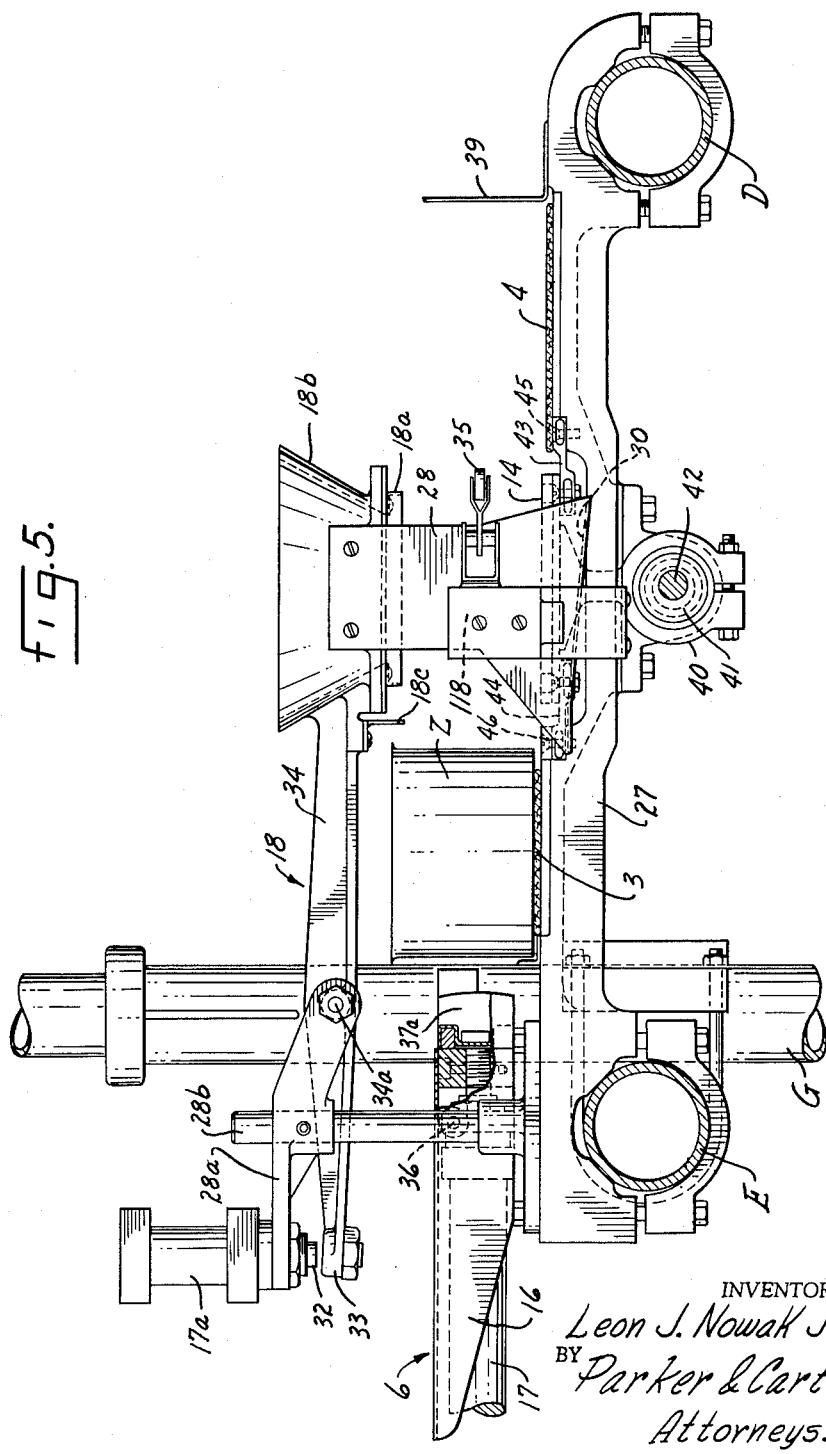

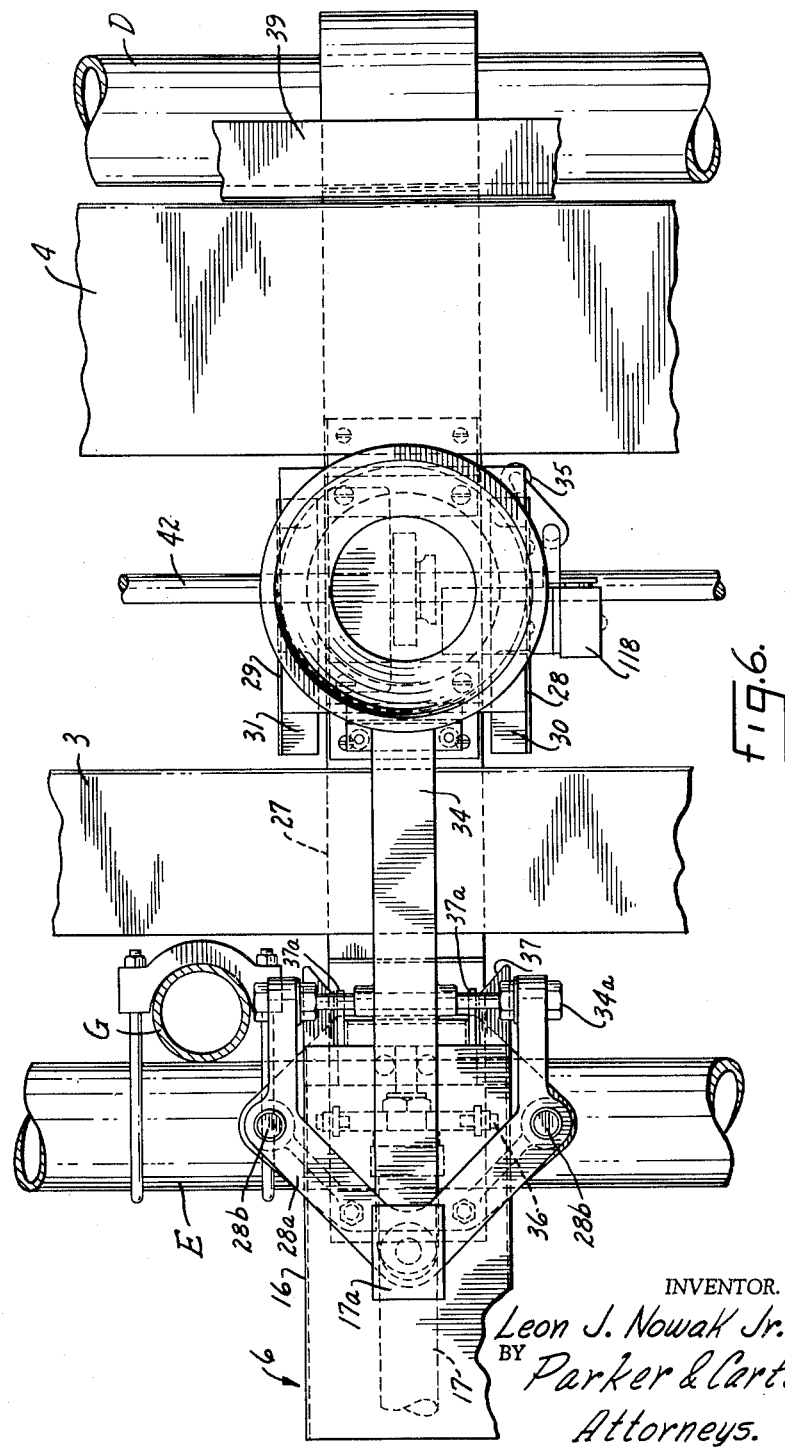

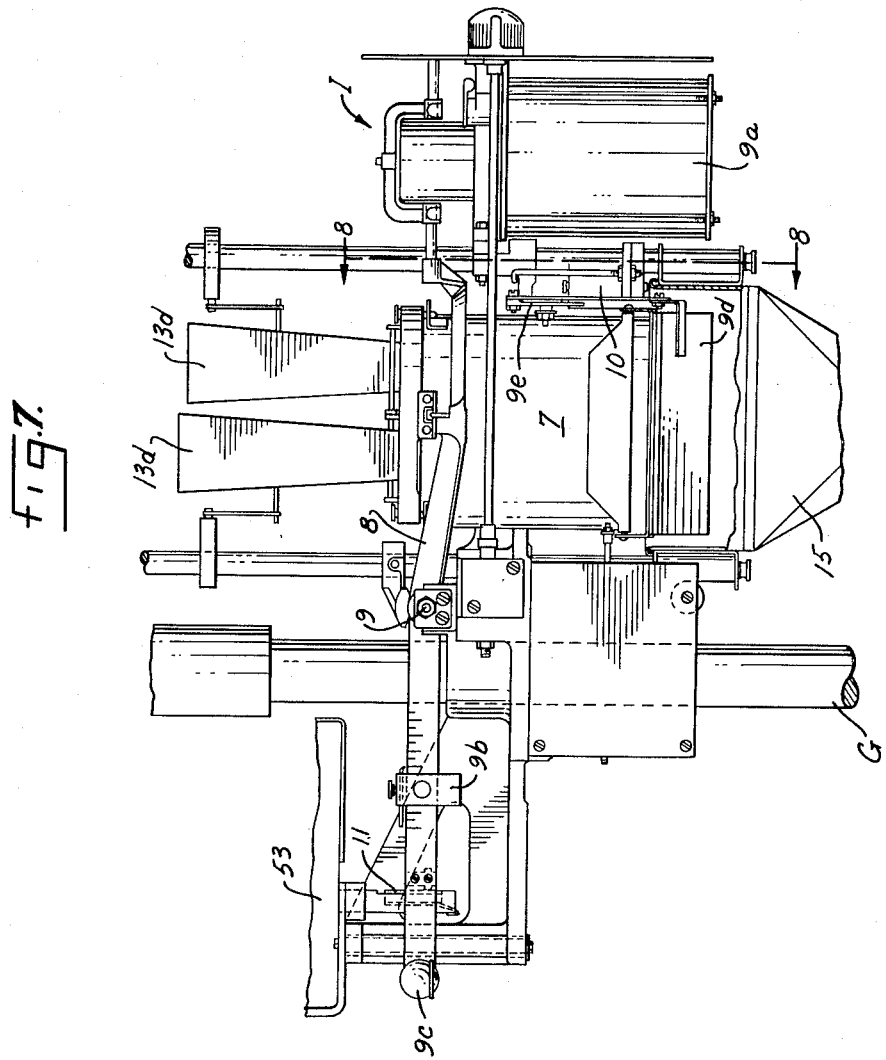

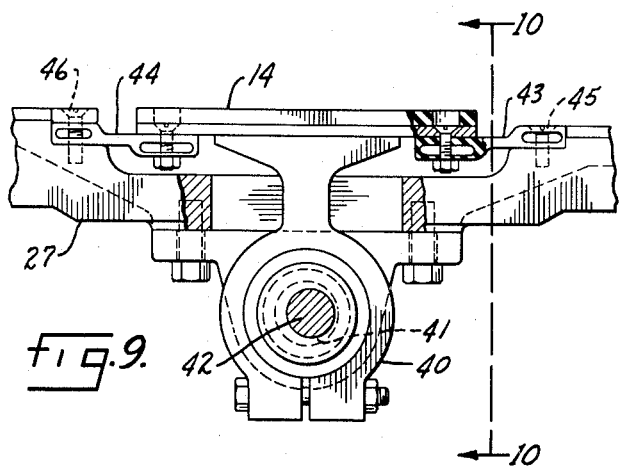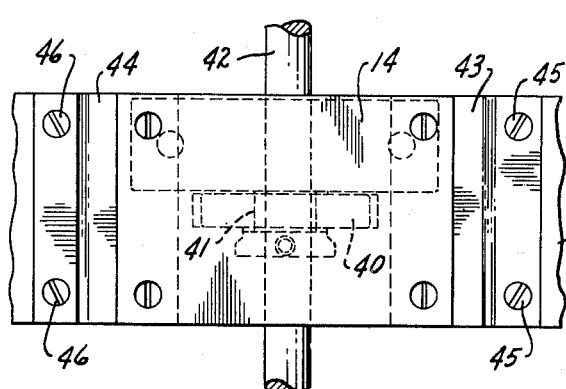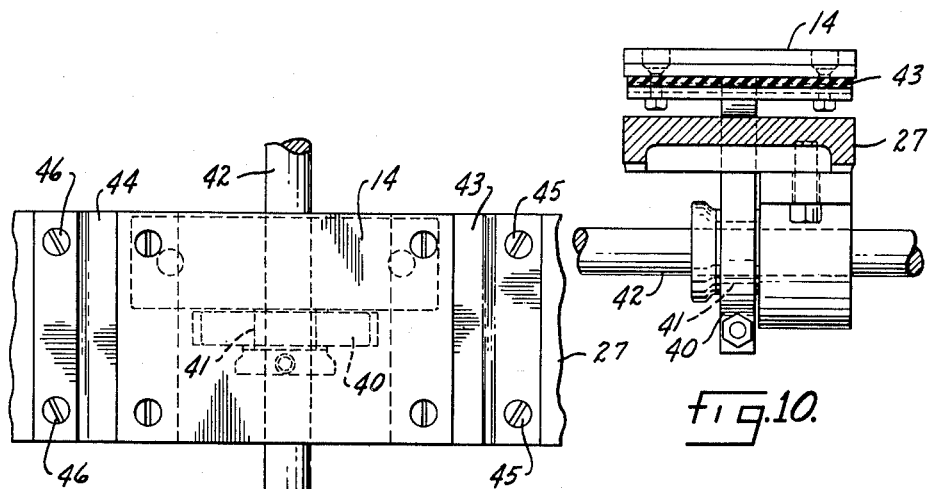

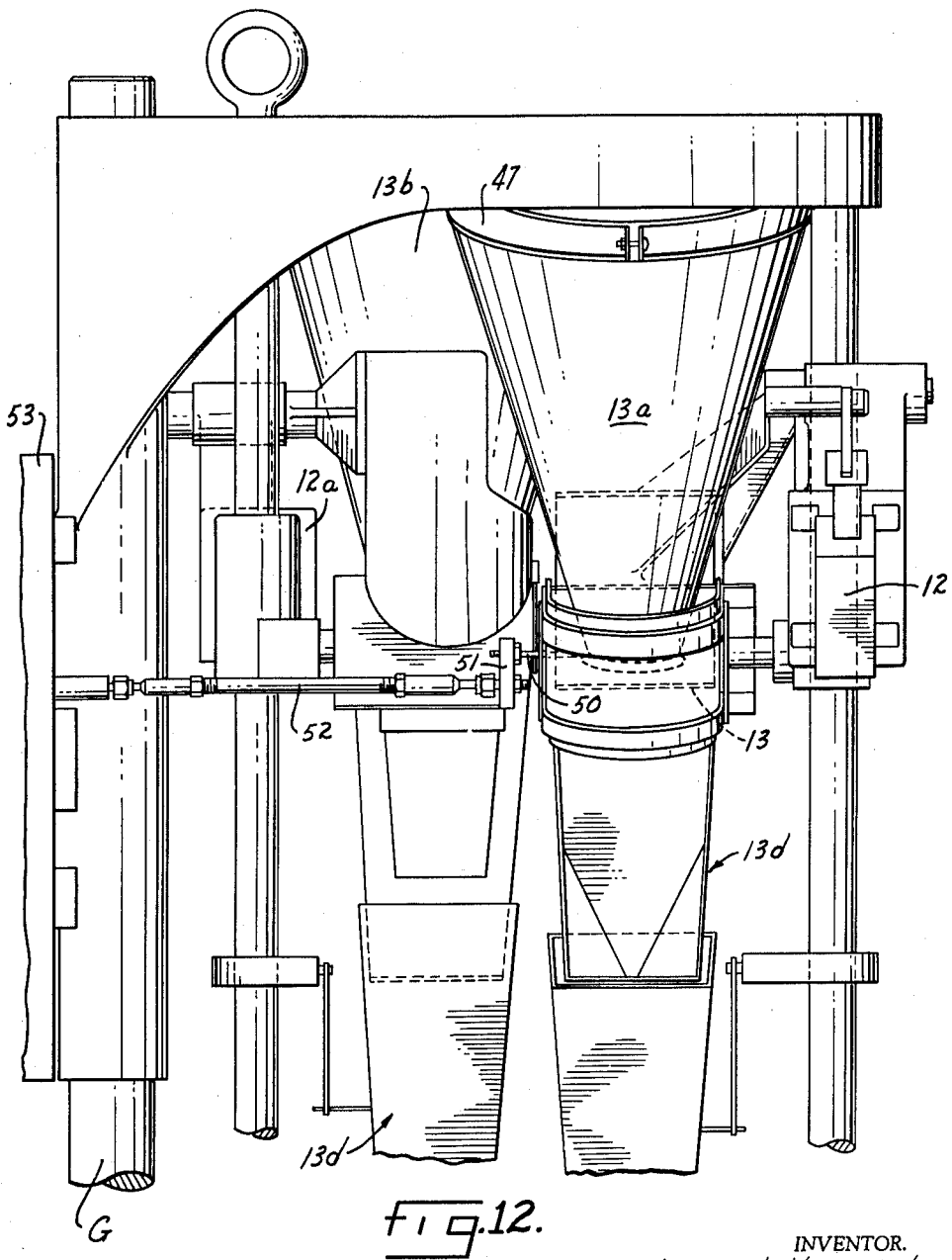

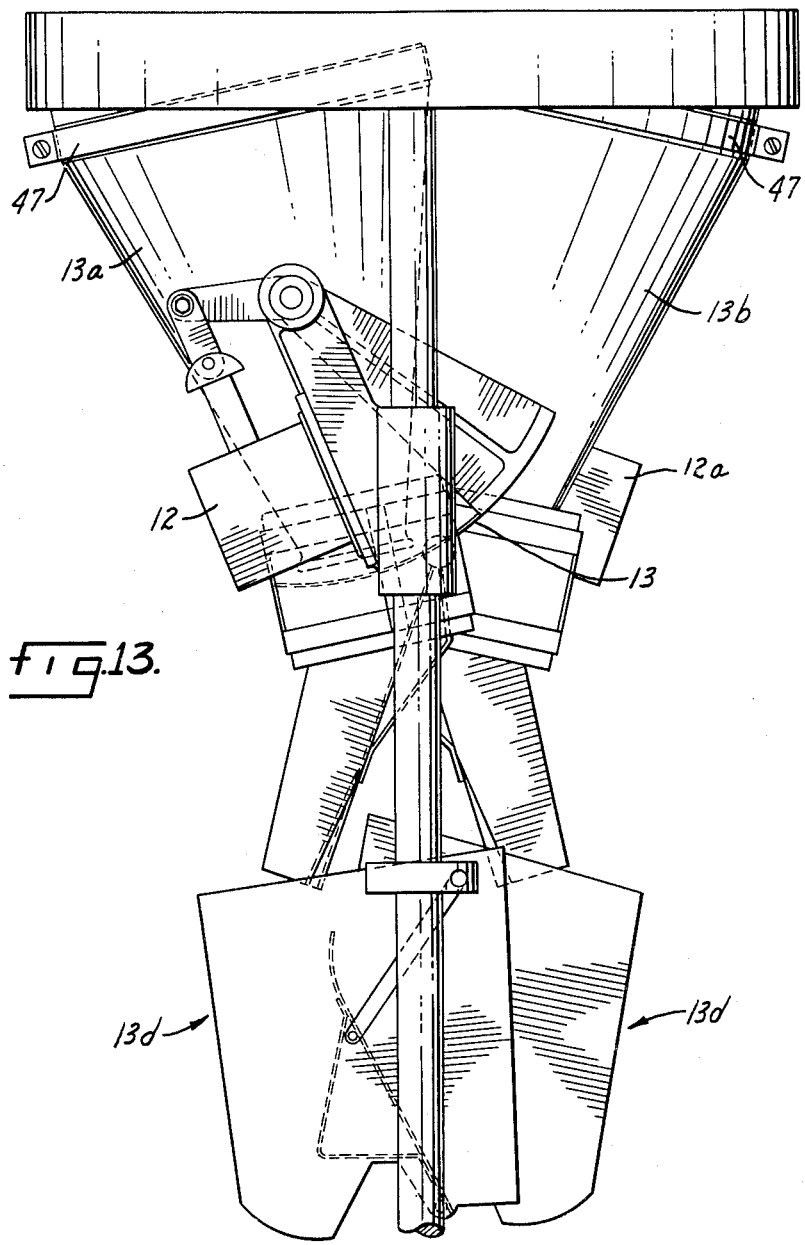

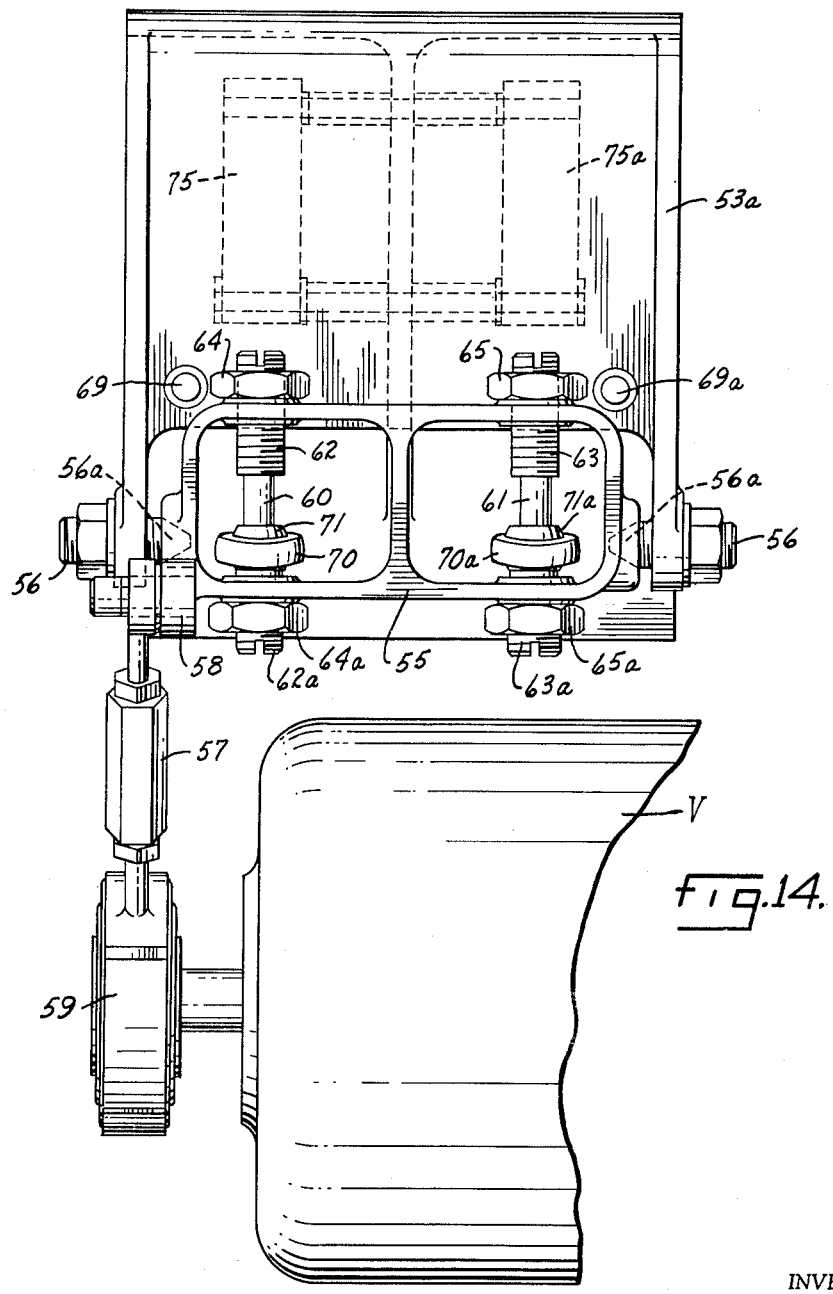

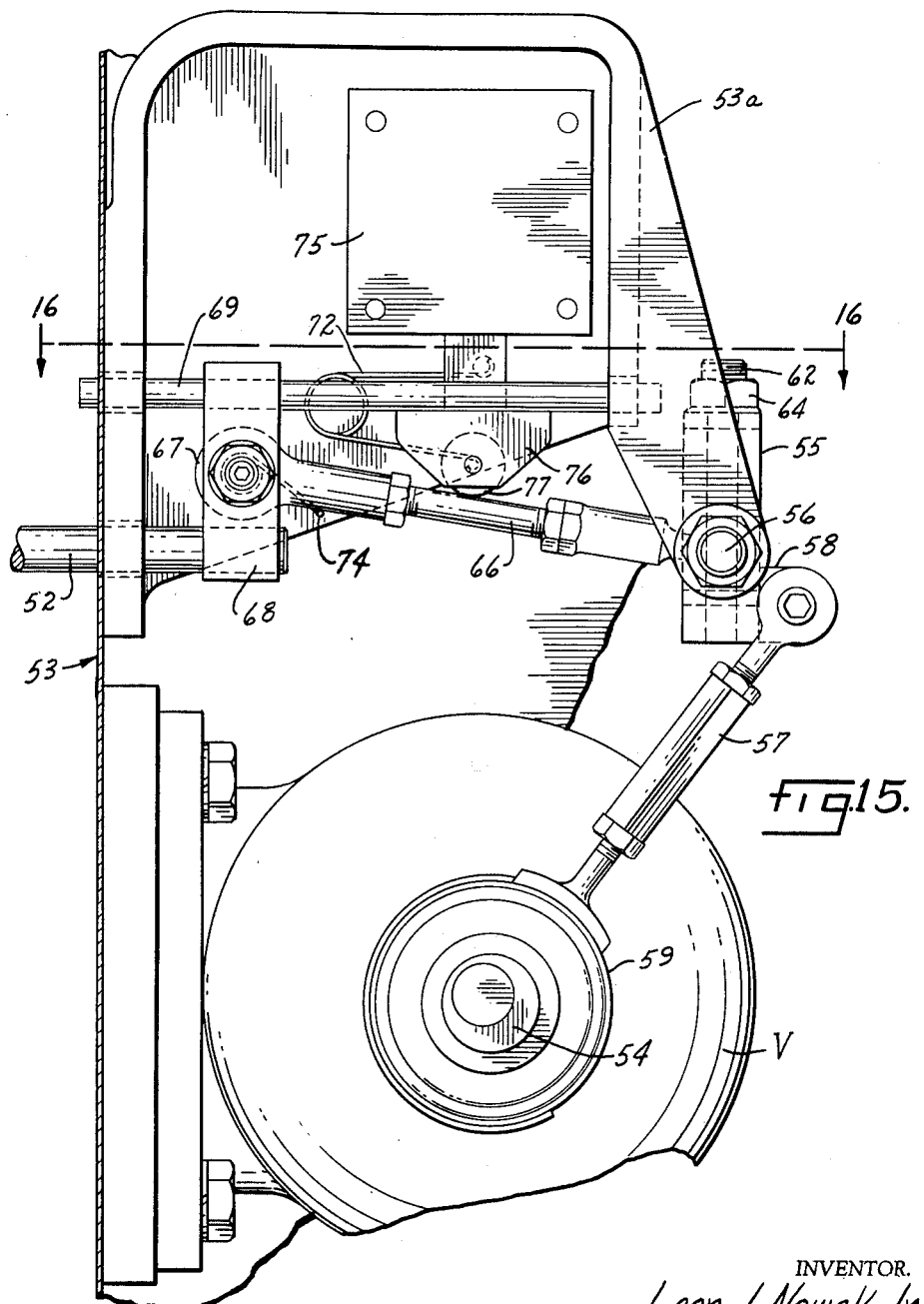

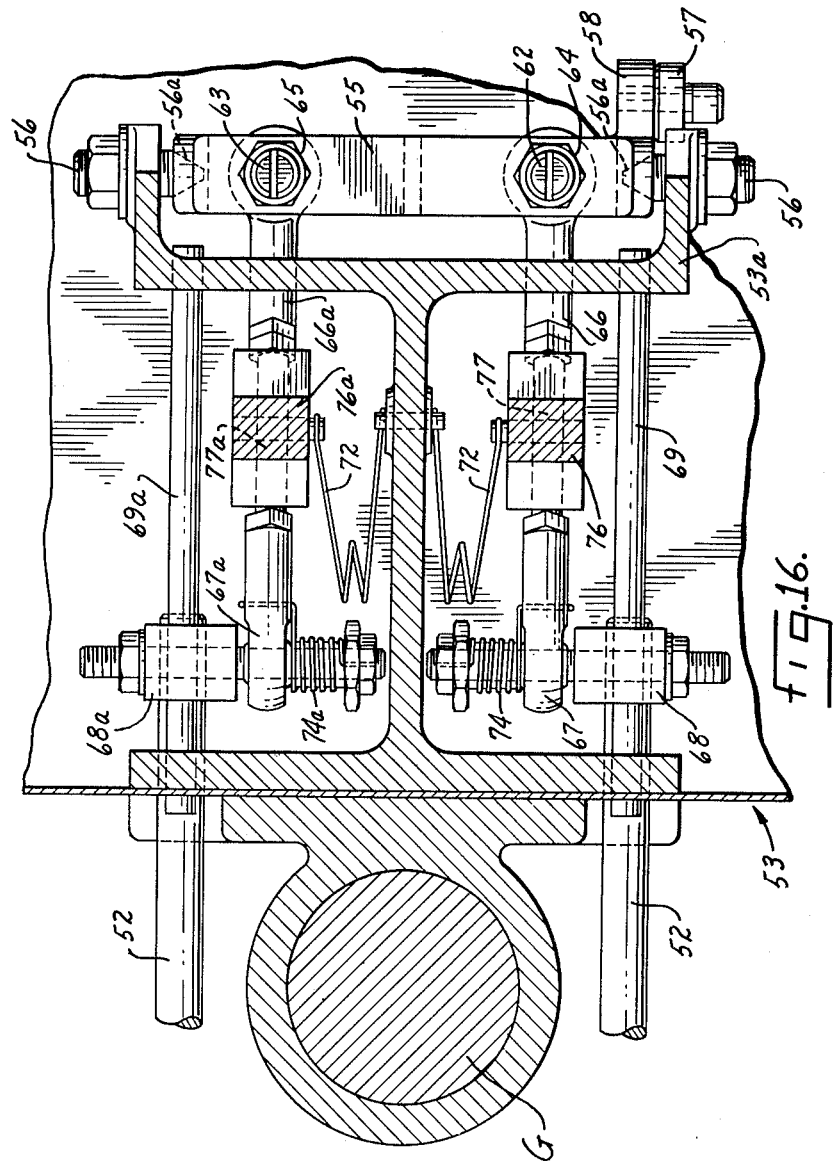

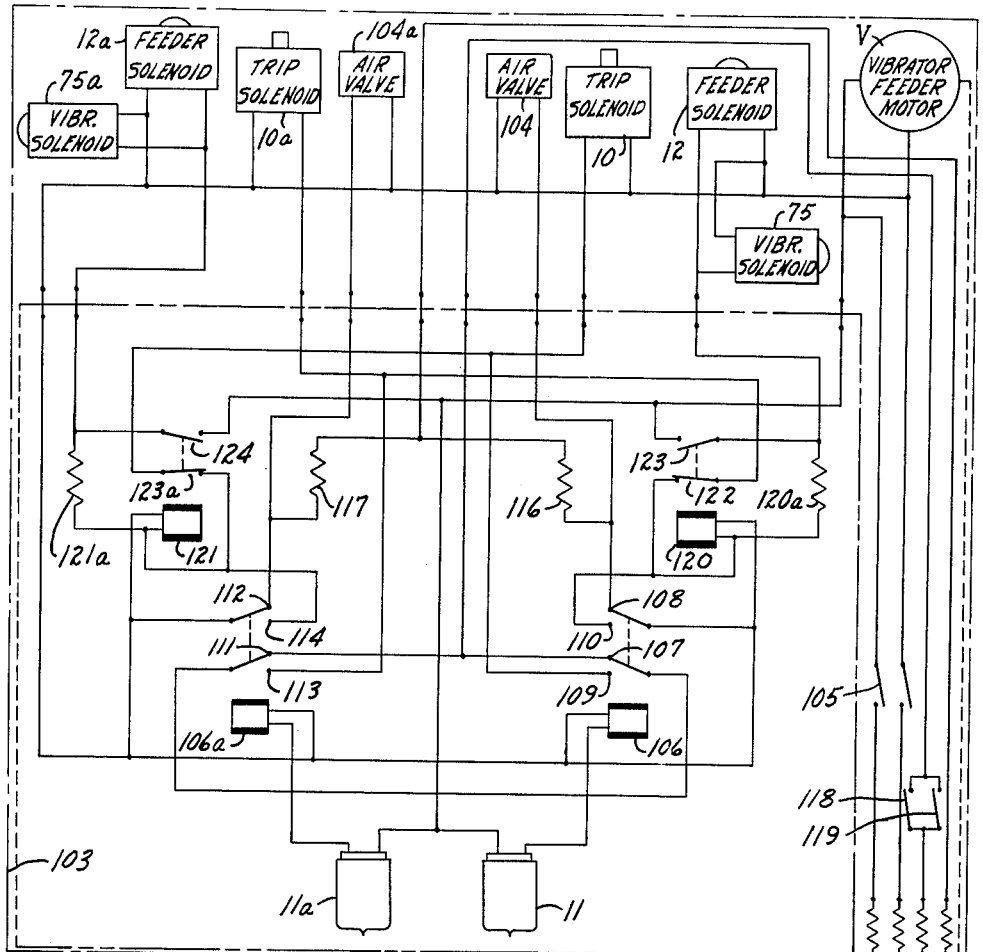
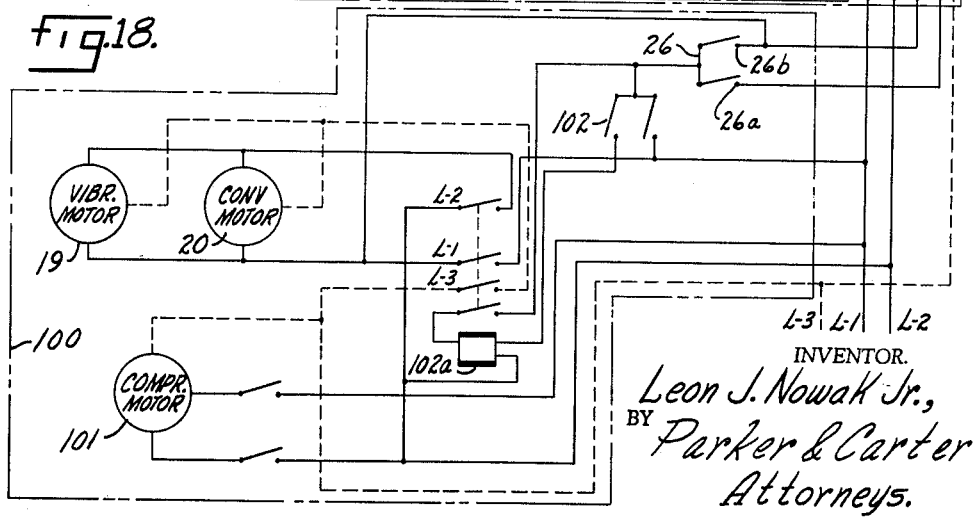
Fig. 18.

3,219,132
AUTOMATIC RECEPTACLE FILLING MACHINE
Leon J. Nowak, Jr., Park Ridge, Ill., assignor, by mesne assignments, to Blaw-Knox Company, Pittsburgh, Pa., a corporation of Delaware
Original application Mar. 30, 1959, Ser. No. 802,923, now Patent No. 3,106,277, dated Oct. 8, 1963. Divided and this application June 4, 1962, Ser. No. 208,164
14 Claims. (Cl. 177—52)

This application is a division of copending application Serial No. 802,923, filed March 30, 1959 now Patent No. 3,106,277.

This invention is directed to an improved automatic automatic receptacle filling system. It is particularly directed to the provision of an automatic machine which fills receptacles with granular material, such, for example, as coffee.

A major purpose of the present invention is the provision of an automatic filling system for receptacles which may be employed over a wide range of filling weights and which may be used with both volumetric and weighing filling systems. The system herein shown illustrates a plurality of units, each of which includes a weighing device and a plurality of vibrating platforms. However, with volumetric feeding, a feeding device with a single platform might be employed.

The system herein shown and described permits any number of filling units to be used in any given assembly. It also permits the use of any number of filling units while permitting the repair and maintenance of one or more of such units without adversely affecting the action of the units which remain in operation.

Another purpose is the provision of an automatic receptacle filling system having a plurality of receptacle filling stations of vibrating platforms for each weighing unit, and which allows for increased vibration time for each receptacle undergoing filling.

Another purpose of the present invention is the provision of an improved automatic filling machine for granular material wherein a predetermined weight of material is closely packed, thus enabling the use of smaller receptacles per unit weight of material in each receptacle.

Another purpose of the present invention is the provision of an improved receptacle filling machine and which minimizes side contact with the receptacle during the filling and packing operation.

Another purpose is to provide means for controlling the automatic filling of containers in predetermined relation to the speed of movement of a discharge conveyor which removes such containers, when filled.

Another purpose of the present invention is the provision of an automatic filling system for receptacles wherein a minimum amount of time is needed for the receptacle filling operation, resulting in increased time for packing, and more tightly packed material in the containers.

Another purpose is to provide a novel vibrating and receptacle handling system having continuously operating vibrating platforms, together with means for supporting the containers out of contact with such platforms as they are moved toward the platforms for vibration, and as they are removed from the platforms after vibration.

Another purpose is the provision of a new and improved vibrated feed chute assembly for granular material.

Another purpose of the present invention is the provision of an improved vibrating mechanism.

Another purpose of the present invention is the provision of an improved automatic filling machine which completes the receptacle indexing cycle after the operator has stopped the machine.

Another purpose of the invention is the provision of an improved can handling mechanism in a can filling system.

Another purpose of the present invention is the provision of the filling station wherein movement of a filled receptacle is initiated by movement of an unfilled receptacle, and filling of an empty receptacle is responsive to movement of a filled receptacle.

Other objects and purposes will appear from time to time in the coure of the ensuing specification and claims.

Referring generally now to the drawings:

FIGURE 2 is a diagrammatic front view of a machine employing the principles of the invention;

FIGURE 3 is an end side elevation of the machine illustrated in FIGURE 2;

FIGURE 4 is an illustration of a drive mechanism for the conveyors utilized in the invention, taken on line 4—4 in FIGURE 3;

FIGURE 5 is a side elevation, with parts in section, of a receptacle handling subassembly utilized in each filling station;

FIGURE 6 is a plan view of the assembly illustrated in FIGURE 5;

FIGURE 7 is a side elevation of a typical automatic weighing mechanism utilized in each filling station;

FIGURE 9 is a front elevation of a receptacle supporting and vibrating mechanism utilized in the invention;

FIGURE 10 is a side elevation, in section, of the receptacle supporting and vibrating mechanism illustrated in FIGURE 9 taken on line 10—10 of FIGURE 9;

FIGURE 11 is a plan view of certain elements shown in FIGURES 9 and 10;

FIGURE 12 is a side elevation of a material feed subassembly utilized in the invention;

FIGURE 13 is a front elevation of FIGURE 12;

FIGURE 14 is a side elevation of the subassembly shown in FIGURE 15, as viewed from the right of FIGURE 15, with parts being omitted for clarity;

FIGURE 15 is an elevational view as viewed from the left of FIGURE 14;

FIGURE 16 is a sectional view taken along the lines 16—16 of FIGURE 15;

FIGURE 17 is a detail view of a typical feed chute; and

FIGURE 18 is a diagrammatic showing of a control circuit utilized in the invention.

Like elements are designated by like characters throughout the specification and drawings.

Figure 1:
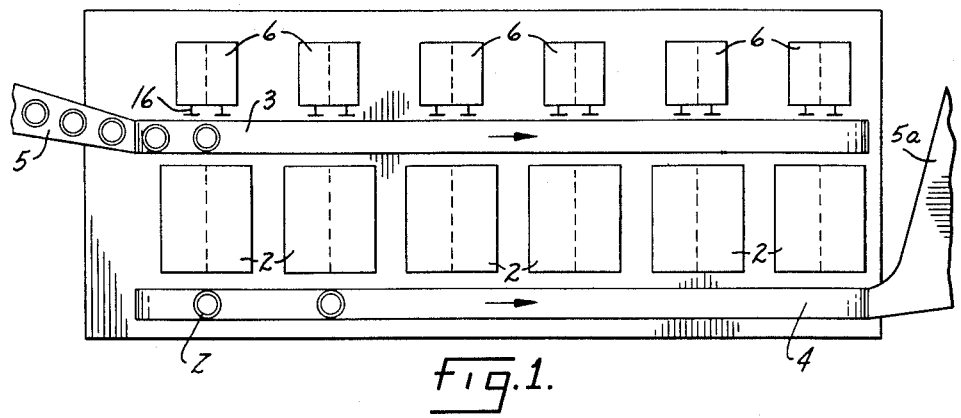
FIGURE 1 is a diagrammatic plan view of the receptacle filling and conveying system constituting the present invention.

In considering the invention herein described and claimed, a system is indicated, diagrammatically shown in FIGURE 1, which includes a delivery conveyor 3, along which empty containers to be filled are moved and a discharge conveyor 4 along which filled containers are removed. I may, for example, employ a plurality of units, which will later be described in detail, each unit having a weighing and feeding assembly preferably of the so-called twin beam types as shown in detail in my previous Patent No. 2,669,412. The details of this twin beam weighing and feeding mechanism do not, of themselves, form part of the present invention and need not be stressed in detail. Each weighing and feeding unit delivers material alternately above two vibrating supports or platforms, in the particular structure or assembly herein shown. In operation, a container is lowered alternately upon each such platform, after removal from the conveyor 3, is filled by the weighing feeder unit which takes care of the two platforms, is vibrated and is thereafter lifted from the platform, laterally moved, and positioned upon the discharge conveyor 4.

In FIGURE 1, I illustrate diagrammatically at 2 a pair of separate vibrating platforms for each weighing feeding unit. The individual weighing feeding units of the type shown in my above mentioned Patent No. 2,669,412 may be supported on a machine frame including, as shown in FIGURE 2, a base A, upstanding frame members B and C at the ends of the frame, longitudinally exteding frame members D, E and F, shown in FIGURE 3, joined to the members B and C, and a plurality of spaced, vertically extending standards G. One of the standards G may be associated with and support each of the weighing feeder units. The units, as such, are indicated generally at H in FIGURE 2 and include the automatic weighing mechanism generally indicated at I in FIGURE 2. As shown, for example, in FIGURE 2, a pair of receptacle retaining and elevating structures, generally indicated at K, and later described in detail, are associated with each unit.

It will be clear from the drawings that a loading conveyor 3 is positioned to receive empty containers or receptacles, for example, from a chute 5. The details of the conveyor 3 do not of themselves form part of the present invention, but as a matter of convenience, I may employ a constantly driven endless belt.

The discharge conveyor 4 may also take the form of an endless belt, and both conveyors may be driven in unison, for example, from the motor 20 of FIGURE 2 through any suitable drive 21. Thus I provide, as an example of convenient conveying means, a pair of endless belt conveyors moving at generally the same level and in the same direction, as shown in the arrows of FIGURE 1. Clearly the specific conveying and conveyor means can be widely varied and the above is shown primarily as a matter of illustration. The discharge conveyor 4 may deliver filled containers or receptacles to any suitable storage area diagrammatically indicated at 5a in FIGURE 1. However, the mechanism for receiving and subsequently handling the filled containers does not form part of the present invention.

Figure 8:
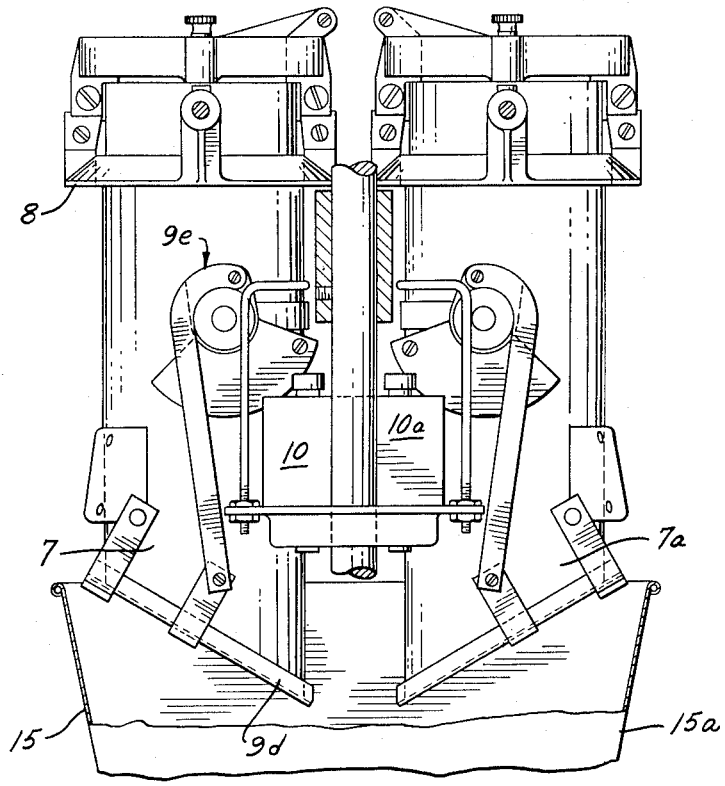
FIGURE 8 is a detailed sectional view of a weigh bucket opening mechanism taken on the line 8—8 of FIGURE 7.

The automatic weighting system of each unit is of the general type and class illustrated in my above mentioned United States Patent No. 2,669,412. In this class of apparatus, material is delivered from a hopper to a pair of weighing receptacles or buckets in sequential relation. As is illustrated in FIGURES 7 and 8, each weighing unit includes a pair of weigh buckets 7 and 7a which are supported by weigh beams. A typical weighing mechanism is illustrated in FIGURE 7. The weighing structure illustrated in FIGURE 7 may be assumed to be the weighing structure for the left side of a typical station 2 as viewed in FIGURES 1 and 2. The weighing unit illustrated adequately, for example, in FIGURES 7 and 8 hereof.

The details of opening and closing of the buckets 7 form no part of the present invention, it being only necesary to an understanding of the invention to realize that energization of a solenoid 10 opens the bucket 7 and after the load is delivered from the bucket, the solenoid 10 is deenergized and the closure 9d returns to the closed position. A dash-pot 9a cooperates with the weigh beam 8. The other end of the weigh beam includes a slidable weight 9b and counterpoise weight 9c which are of a preselected magnitude to balance a predetermined load for the bucket 7a. The bucket 7 has a bottom closure 9d pivotally connected thereto. The bottom closure 9d is adapted to be opened by a toggle linkage generally designated at 9e. The toggle linkage 9e is actuated by a solenoid 10, which, when energized, moves the linkage and thereby the closure 9d for the bucket to an open position, thereby releasing a predetermined mass of material accumulated in the bucket.

When the weigh beam 8 moves downwardly in response to the preselected load of material in the bucket 7, it closes a switch 11. The delivery or feed of material to the bucket is controlled by the actuation of the solenoid 12, shown in FIGURE 12, whereby actuation of the solenoid 12 moves a clam shell closure 13 for a feed chute 13a to the open position to thus commence the feed of material. When the solenoid 12 is de-energized the clam shell closure closes the lower end of the chute 13a and thus the flow of material to the bucket is terminated.

With reference, for example, to FIGURE 2, it will be understood that by the above described structure which does not of itself form part of the invention hereof material is delivered successively to receptacle filling chutes 15 and 15a, a pair of which are associated with each of the above described units. These filling chutes, in turn, deliver material each to one of the two stations shown at 2 in FIGURE 1. Each station includes a receptacle vibrating platform as shown, for example, at 14 and 14a in FIGURE 2, each vibrating platform 14 or 14a being positioned beneath a receptacle filling chute 15 or 15a. It is peculiar to this type of weigher that discharge of material is first from one bucket and then from another bucket of each pair of buckets, making it possible to fill one receptacle and to vibrate that receptacle while the other adjacent or companion receptacle is being filled. Thus, as to each of the pairs of stations shown in FIGURE 2, as 14 and 14a, it will be understood that, with receptacles on the vibrating platforms 14 and 14a the material is quickly delivered to one receptacle, and that receptacle is vibrated during the weighing of the material to its companion receptacle. This doubles the vibrating time available to each receptacle or container.

The centers of adjacent platforms may be spaced from one another by a distance on the order of the widths (or diameters) of two receptacles. Each left-hand chute is adapted to receive material from the left-hand weigh bucket when the bucket is dumped, and thereby delivers a selected batch of material to a receptacle positioned on the left-hand vibrating platform 14. The chute 15a similarly receives material from the right-hand bucket 7a for delivery to a receptacle on the right-hand vibrating platform 14a.

A generally V-shaped trough T, as seen in dotted outline in FIGURE 3 may extend for the full length of the machine underneath each of the filling stations so that in case of spillage, the spilled material is collected in the trough T.

Referring, for example, to FIGURES 5 and 6 which illustrate the above mentioned belts 3 and 4, containers or receptacles to be filled as indicated at Z in FIGURE 5 are moved from the belt 3, which takes them to the loading position, by operation of a receptacle loading mechanism 6 which includes plungers 16 actuated by pneumatic motors 17. Each plunger 16 is effective to move a container or receptacle Z to the right, referring to the position of the parts as shown in FIGURE 5. At the same time, at each unit and for each platform, an additional pneumatic motor 17a is effective to elevate the right-hand arm of the lever structure 18, to permit the container Z to be moved to the right to the appropriate vibrating platform 14 or 14a. Actually, each air motor 17a operates before its associated air motor 17 so that the arm or lever 18 is properly elevated to permit the passage and positioning of the container Z. During the movement of the container or receptacle, and due to the elevated position of the right-hand end of the arm 18, the container actually rides upon projections 30 and 31 from the below described side plates 28 and 29. It is only when the plunger 32 of the pneumatic motor 17a recedes that the structures associated with the lever 18 permit the container Z to rest directly upon and be vibrated by a continuously vibrating platform 14 or 14a. At the same time, the rim 18a enters the mouth of the container or receptacle and prevents its movement from the vibrating platform. This rim 18a is in vertical alignment with the indicated funnel 18b of FIGURE 5 and one of the chutes 15 of FIGURE 2 whereby material may be delivered to the interior of the container. As a noise preventer and as a means for preventing injury to the container, the rim 18a may be formed of or lined with rubber or some other suitable material. It will be understood that a similar receptacle retaining structure with its appropriate pneumatic motors is associated with each of the vibrating platforms 14 of the machine.

It will be well to summarize some of the major features of the invention preparatory to a more detailed treatment of specific features. The basic organization has already been described and is adequately shown generally in FIGURES 1, 2 and 3. It will be understood that, in practice, the feed conveyor 3 and the discharge conveyor 4 operate continuously. It will be further understood that at each unit a weighed charge is alternately delivered through the spouts 15 and 15a to open topped containers or receptacles positioned therebeneath. Each such receptacle is positioned upon a constantly vibrating platform or support 14 or 14a. Each receptacle is moved from the feed conveyor 3 and is located above and positioned upon one of the vibrating platforms. Each container or receptacle, after it has been filled and has been vibrated for a satisfactory period, is lifted from its vibrating platform, is deposited upon the discharge conveyor 4, and is removed for further treatment for disposal. The specific mechanisms or organizations for obtaining the above results will now be described in somewhat greater detail.

The following means are employed to provide a continuous vibration of the platforms 14 and 14a. Each of the supporting platforms include a depending bearing hub 40, as is seen best in FIGURE 5 and shown in detail in FIGURES 9, 10 and 11. The depending bearing hub 40 surrounds an eccentric 41 carried by a shaft 42. The shaft 42 passes through all of the bearing hubs for the platforms and a separate eccentric 41 is provided on the shaft 42 for each hub. The shaft 42 is driven by the motor 19 and is continuously rotated. Thus each of the platforms in the machine are continuously oscillated.

Flexible strips 43 and 44 are connected to each of the opposite ends of the platform 14 and are fastened to the frame member 27 as by any suitable connections 45 and 46. The strips may be made of rubber or a suitable substitute, to allow a predetermined degree of vertical motion of the ends of the platform.

During rotation of the shaft 42, the central portion of each of the platforms will be vertically displaced and the platform will also undergo some lateral displacement due to the eccentrics 41. The flexible strips 43 and 44, however, hold the platform under flexible constraint and the result is an up and down motion of the platform combined with a rocking of the ends of the platform about the central portion of the platform as an axis. Thus, a receptacle or container positioned on the platform will be continuously subjected to a compound vibration.

Consider now the transfer of the receptacles or containers to the vibrating platforms. In FIGURES 5 and 6, the conveyors 3 and 4 are shown as moving above cross-frame members 27 which are mounted on the longitudinally extending frame members D and E. Only one such cross-frame and assembly is shown in FIGURE 6, but it will be understood that there are two such cross-frame members for each unit H, I so that a cross-frame member 27 extends beneath each spout 15 or 15a.

The structure of FIGURE 6 can be taken as typical for all. Above each cross-frame member 27 is a receptacle retaining structure 18. It is shown as including a lever or arm 34 pivoted at 34a in a suitable yoke or frame 28a adjustably mounted on vertical pins 28b. The yoke 28a is shown as carrying a pneumatic motor generally indicated as 17a and having a suitable plunger 32, shown in inoperative position in FIGURE 5, but capable of being moved downwardly against the abutment 33 on the lever 34 in order to rotate it counterclockwise about its pivot 34a, with reference to the position of parts as shown in FIGURE 5.

The retaining structure 18 includes side plates 28 and 29 which are shown as generally vertical and which are located at opposite sides of the retaining structure. These side plates carry inward extending portions or supports 30 and 31 which, in the lowered position of the retaining structure in which it is shown in FIGURE 5, lie in a plane below the upper surface of the vibrating platform 14. These portions 30 and 31 are shown as downwardly inclined toward the conveyor 4. When the parts are in the position in which they are shown in FIGURE 5, a container Z, to be moved, is shown as located on the feed conveyor 3 but is held against movement toward the vibrating platform 14, for example, by a stop 18c. However, assume that the air motor 17a is actuated to tilt the lever arm 34 upwardly away from the vibrating platform 14, then the stop 18c is withdrawn, and the container can be moved into position over the vibrating platform. When initially moved it will ride on the side plate portions 30 and 31 to act as tracks or supports and which, when the right end of the lever 34 is upwardly tilted, will support the container Z at a level above the top of the vibrating platform.

Assume that the lever 34 has been tilted as above described, by downward movement of the piston 32 of the air motor 17a, the container is then free to move to the right, referring to the position of the parts shown in FIGURE 5. An additional air motor 17, actuating a plunger 16, is employed. This pneumatic motor is mounted on the frame structure as shown in FIGURE 6. Guide rollers 36a prevent 16 from twisting. The plunger 16 is provided with guiding faces 37, as shown in FIGURE 6. Means are provided for gripping a receptacle or container positioned on the belt 3. I may, for example, employ a bar magnet 37a which is rigidly mounted on the plunger or piston of the air motor. When the air motor 17 operates to move the plunger 16 against the container Z, the air motor 17a having already tilted the arm 34, the container or receptacle Z is slid out across the track or supporting members 30, 31 and is pushed against and ejects a previously positioned and filled container. Thus the filled container or receptacle is forceably ejected from above the vibrating platform 14, along the supports 30 and 31, and is delivered to the continuously moving discharge belt 4. At the end of the forward movement of the plunger 16 the empty container Z is properly positioned above the vibrating platform 14, being held by the magnet until clamp 18 operates and the air motor 17 returns to its initial position. Thereafter the plunger 32 of the upper air motor 17a recedes to its upper position and lever 34 tilts into the position in which it is shown in FIGURE 5, depositing the container Z upon the vibrating platform 14.

I may employ a ledge 39, as shown in FIGURE 5, to prevent the filled container from moving beyond the discharge conveyor 4. I may also employ abutment means, not shown, at the end of the conveyor 3 to permit a solid row of receptacles to be positioned along the entire length of the belt 3. The belt 3 continues its motion even though the receptacles are held in position ready for movement to the vibrating platforms. The belt simply slides under the stationary receptacles.

A roller 35 is positioned on the exit side of the structure 18, and is contacted by a receptacle when the filled receptacle is thrust from the vibrating platform 14 for delivery to the discharge conveyor 4. The roller 35, as is clear from FIGURE 6, is biased, preferably spring biased, to a position in which it will be forced outwardly by the contact of the ejected container. For purposes which will later be discussed, this outward movement of the roller 35 closes a switch 118.

Consider now the chute assembly for delivering material to the so-called twin beam weigher structure of, for example, FIGURES 7 and 8. I provide frusto-conic chutes for each weighing unit, these chutes 13a and 13b being preferably identical in structure and operation. An individual chute is shown in detail in FIGURE 17. The employment of flexible material permits an adjacent vibration of these chutes to maintain adequate continuous delivery form the hopper 13c of each unit H. The sequence of flow will be understood, for example, from the disclosure of FIGURE 3. Each feed chute, as shown in FIGURES 12 and 13, is supported at its upper end by a clamp 47. The lower end of each chute 13a or 13b has a circular rim 48 which may be molded around a ring 49 from which extends a rod 50. Each rod 50 is connected through a link 51 with a slideable shaft 52 of a vibratory mechanism 53. This vibratory mechanism is shown, for example, in FIGURES 14, 15 and 16. Each such vibratory mechanism for one of the filling units is mounted upon an upright frame member G. Such a vibratory mechanism 53 is used to actuate each rod 50 of the feed chutes 13a and 13b of each station.

The vibratory mechanism includes a continuously operated vibratory motor V at each station which may be directly connected across the lines of a power source, as is illustrated in FIGURE 18. The motor drives an eccentric 54. A yoke 55 is pivotally mounted as at 56 on a portion of the supporting frame for the vibratory unit. A link 57 is pivotally connected to an ear 58 of the yoke and is connected at the other end thereof to a collar 59 which surrounds the eccentric 54. Thus during rotation of the eccentric 54 the link 57 will be oscillated and the yoke 55 will be continuously oscillated about its pivot axis 56. The yoke 55 is shown as mounted upon conic bearings 56a The yoke includes a pair of spaced supporting members or rods 60 and 61, as seen in FIGURE 14. The axis of the rods pass through a plane common to the axis of the conic bearings 56a. The rods 60 and 61 may be threaded on the yoke 55. The rods are slidably received in abutments 62 and 63 which are spaced from the pivot axis of the bearings 56a, 56a. The abutments 62 and 63 may be threaded in the upper portion of the yoke 55. Retaining nuts 64 and 65 threadably engage the upper outer end of the abutment and bear against the upper end of the yoke 55. Abutment members 62a and 63a are threaded in the lower portion of the yoke 55 and locked in position by nuts 64a and 65a. Thus, by loosening the nuts 64 and 65, and 64a and 65a the abutments 62, 63, 62a and 63a may be adjusted on the rods, thus varying the effective distance between the abutments and the pivot axis of the yoke.

In connection with the vibrating mechanism shown in FIGURES 14 to 16, inclusive, each eccentric 54, through its link 57, oscillates a cage 55 about an axis defined by the adjustable stems 56 with their conic bearings 56a. The cage 55 is thus supported by and rotatable in a suitable frame portion 53a of the vibrator mechanism 53. It will be seen, as in FIGURES 15 and 16, that the cage 55 has an ear or lug 58 to which the outer end of the linkage 57 is pivotally secured. Thus, the result of the rotation of the eccentric 54 is to oscillate the cage 55 about its above described axis.

Guide members or rods 69, 69a are mounted in the frame of the vibrator mechanism 53 and slidably support blocks 68 and 68a respectively, each such block being secured to one of the rods 52 which extends to a stem 50 of one of the flexible frusto-conic chutes 13a and 13b.

In order to transmit vibration from the eccentric 54 and the cage 55 I provide the link assemblies 66, 66a. Each such link has an eye 67 or 67a pivoted to one of the slide blocks 68 or 68a. Each such link is biased for counterclockwise movement, referring to the position in which the links are shown in FIGURE 15, by springs 74 or 74a. The opposite end of each such link is provided with a hub 70 or 70a provided with an inwardly spherical bearing surface engaging a correspondingly spherical bearing outer surface 71 or 71a of a member which is slideable along rods 60 or 61 mounted in the cage 55.

Thus, the ball joints above described slide freely, within limits, on the rods 60 or 61. In the position in which the parts are shown in FIGURE 14, the balls 71 and 71a are aligned with the axis of the yoke 55 passing through the bearing member 56a. The range of movement on the pin 60 may be controlled by adjustable abutment members 62, 63 at one end, and 62a, 63a at the other, these abutments being set in adjusted position, for example, by nuts 64 and 65, or 64a and 65a.

When a ball joint assembly above described moves upwardly on the stem 60 or 61 the oscillating cage 55 imparts motion to the linkage assembly including the links 66, which results in a vibratory motion of the stems 52. I may thus provide an intermittent vibration of the chutes 13a and 13b which are vibrated only during the feeding operation. The linear vibration of the rods 52 is intermittently obtained in response to the continuous rotation of the eccentric 54. A continuous vibration is converted into intermittent vibration, without the employment of any clutch component.

Solenoid rollers 77, 77a normally gravitally resist the lifting action of the spring 74 and hold the linkage in the lifting position shown in FIGURES 14 and 15. The normal weight of the cores or plungers is sufficient to force the links 66 and 66a downwardly, to maintain the point of connection between the links 66 and 66a concident with the axis of the cage 55, so that no vibration is transmitted to the rods 52. If necessary, additional springs may be used, as indicated at 72a, to amplify or to add to the weight of the solenoid cores 76 and 76a. When the solenoid is energized the cores 76, 76a are upwardly withdrawn, and the springs 74 then elevate the ball joints above described as far as is permitted by the adjustment of the members 62 or 63 and an effective amplitude of vibration is thereby imparted to the rods 52. Thus, from a constantly vibrated cage or element 55 vibration, at will, may be imparted to the rods 52 and thus to the chutes 13a and 13b.

It will not be necessary to enter in detail into the operation of the twin beam weighing assembly shown, for example, in FIGURES 7 and 8. During the operation of the device, and referring now to FIGURE 3, the frusto-conic chutes 13a and 13b are vibrated during actual feed. The material fed therefrom passes through supplemental chutes 13b, shown, for example, in FIGURE 12, to the earlier described weighing mechanism and is thereby delivered in weighed charges to the containers or receptacles positioned on the vibrating platforms.

The control circuit for the system herein is illustrated diagrammatically in FIGURE 18. The control circuit includes two major components. One component is enclosed by the dash lines 100. It includes the conveyor motor 20 (shown in FIGURE 2) and the receptacle supporting platform vibrating motor 19 (also shown in FIGURE 2). It may also include a compressor motor 101. The compressor motor 101 is employed to drive an air compressor (not shown) and supply air under pressure to the can or receptacle loading fluid motors 17 and 17a. This component of the circuit is connected across the lines of a power source which may be three-phase, as is designated by the lines L1, L2 and L3. The conveyor motor 20, platform vibrating motor 19, and compressor motor 101 are adapted to be cotinuously energized by this component of the circuit as long as a manually actuated start and stop switch 102 is closed. Thus the conveyors are continuously driven and the receptacle supporting platforms are continuously vibrated as long as the switch 102 remains closed.

Another essential component of the control circuit is enclosed by the dash lines 103. This component of the circuit controls the sequential delivery of material to the receptacles at each unit and controls the movement of the receptacles into and out of each filling station. The circuit component enclosed by the dash lines 103 as shown, is for one complete unit and can handling mechanism for that unit. When more than one unit is employed in the system, as is illustrated by the six units in FIGURE 1, the system will include a circuit component identical to that enclosed by the dash lines 103 for each unit. The circuit component for each unit is connected across the lines of the power source as is the case with the station circuit component illustrated generally at 103, and inter-related with the same conveyor drive circuit in a manner to be later more fully explained.

Each of the circuit components for an individual unit includes a circuit associated with each of the receptacle supporting and vibrating platforms 14 or 14a and with each of the weighing mechanisms of that particular unit. One circuit portion, for example, the one associated with the receptacle supporting platform at the right-hand side of a unit, as viewed in FIGURE 2, includes the solenoid 10a, which when energized opens the bucket gate for that platform, the feeder solenoid 12 which, when energized opens the closure for the hopper or chute which delivers material to the bucket, and air valve 104 which, when energized by a solenoid 10, delivers air to the fluid motors 17 and 17a associated with that platform, and the magnetic mercury switch 11 which is associated with the scale beam for the right-hand weighing assembly.

The other portion of the circuit for that particular unit similarly includes the solenoid 10a for the other bucket opening mechansm, a solenod 12a for the closure associated with the feed chute for the left-hand receptacle platform, an air valve 104a for the receptacle loading fluid motors 17 and 17a associated with the left-hand vibrating platform and a magnetic mercury switch 11a associated with the scale beam for that particular platform.

The air valves 104 and 104a are of a well known solenoid type. They are adapted, when energized, to first deliver air to the motor 17a and then, after a predetermined time delay, to admit fluid to the motor 17.

A vibrator motor for the feed chutes is illustrated at V. The solenoids 75 and 75a which, when energized, cause vibration of their associated feed chute, are connected in parallel with the solenoids 12 and 12a for the clam closures of the feed chutes. Thus when these solenoids 12 and 12a are energized to open the feed chutes, the vibrator solenoids 75 and 75a will be energized to cause vibration of the material delivery chutes. It should be noted that the vibrator motor V is continuously energized. One such motor is employed for each unit.

Each of the unit circuit components includes a manually actuated start and stop switch 105 in the power source line. When the switch 105 is open, no current goes to that unit circuit component and all of the unit circuit elements are then de-energized. Thus, in a system employing more than one unit, the operator of the system may selectively use any number of units at one time. The operator simply closes the switch 105 for each unit desired to be put in operation.

Each of the magnetic mercury switches 11 and 11a have associated therewith relays 106 and 106a respectively. These relays are adapted to be energized when the associated magnetic mercury switches 11 and 11a, respectively, are closed.

The relay coil 106 is adapted, when energized, to open the normally closed contacts 107 and 108 and to close the normally open contacts 109 and 110. Similarly, relay coil 106a is adapted, when energized, to open the normally closed contacts 111 and 112 and to close the normally open contacts 113 and 114.

The switches associated with relay 106 are interlocked with the switches associated with relay 106a in a manner such that energization of the relay not only conditions one weighing mechanism and receptacle loader for receptacle filling and receptacle movement, but also sets up the feeding mechanism for the other weighing system at that unit for a feeding operation to the bucket of the other system, while insuring that only one bucket is dumped at a time.

The unit circuit component is related to the conveyor drive component in a manner such that the speed of the conveyors regulates the number of receptacles filled per unit of time. The cam 23, which is driven by the conveyor motor 20, periodically closes a switch contact 26a in a line leading to the air valves 104 and 104a. This line, however, includes resistances 116 and 117 which act to short out the line leading to the respective air valves as long as the switches 108 and 112, which are in series with the air valves, are closed. The air valves 104 and 104a are then, in effect, merely on the single line L2. The cam 23 also periodically closes, at the same time, another contact 26b which leads through receptacle delivery switches 118 and 119 and in turn to the normally closed contacts 107 and 111 of the relays 106 and 106a. As long as each of the relays 106 and 106a are de-energized, the switch contacts 107 and 111 remain closed and closing of the switches 118 or 119 accomplishes nothing. In operation, however, relays 106 or 106a will be periodically and sequentially energized with the result that one or the other of the normally closed contacts 107 and 111 will be open and correspondingly either the switch contact 109 or 113 will be closed. The contacts 107 and 111 bypass one another to supply current through switch contacts 113 and 109, respectively, when the relays 106a and 106, respectively, are energized.

The switch contact 118 is closed whenever a receptacle moves outwardly from the associated platform at the filling unit (as seen in FIGURE 6). The switch contact 119 operates similarly for the other platform. Thus, when either one of the receptacles at the unit has been filled and is moving outwardly onto the conveyor 4, one of the switches 118 or 119 is closed to deliver current to the solenoid 10 or 10a through the switch 109 or switch 113, as the case may be, to open the bucket gate associated with the solenoid and deliver material to the unfilled receptacle moved onto the platform with the outward movement of the filled receptacle.

At the same time, a relay coil 120 or 121 is energized with the energization of the relays 106 or 106a. The relays 120 and 121 are energized in response to the energization of the solenoids 10a and 10, respectively, so as to start the feed to the weigh bucket on one side while the other side is being dumped. When the relay coil 120 is energized, the switch 122 is opened and the switch 123 is closed. Similarly, when relay 121 is energized, switch contact 123a is opened and switch 124 is closed. The switches 123 and 124 establish what are in effect holding circuits for the relay coils 120 and 121, respectively. When current is supplied to the solenoid 10, which opens the bucket gate, and allows material to be delivered to the receptacle beneath the bucket, the relay 121 is energized (through switch 123a), closing switch 124, to supply current to the solenoid 12a and thus start the feed in the other weigh mechanism. Similarly, when the solenoid 10a is energized, relay 120 is energized, closing switch 123, to supply current to solenoid 12 to commence the material feeding operation for the other weighing mechanism. The feed is stopped by the closing of the associated weigh beam switch 11 or 11a since closure of the beam switch 11 or 11a results in closing the associated switches 110 or 114, thus shorting out the relays 120 or 121. The current is then bypassed into resistances 120a or 121a.

Thus it will be seen that the operation of the unit circuit component is dependent upon the speed of movement of the conveyor 4, through the medium of the cam switch 26 and also dependent upon the closing of one of the switch contacts 118 or 119.

In a typical sequence of operation, the operator will close the switch 102 to start the conveyors in movement. The operator will also close the switch 105 for each unit that is desired in operation. The operator also will push one of the scale beams downwardly momentarily (at each unit desired in operation) to close one or the other of the magnetic mercury switches 11a or 11. For example, switch 11a may thus be closed. This results in momentary energization of the relay coil 106a, opening of switch 112 and when the conveyor switch 26a is closed, the air valve 104a is energized to move a receptacle into filling position on the platform. The switches 118 and 119 are open at this time and hence the solenoid 10a is not actuated and the feed solenoid 12 remains de-energized. The operator may then release the weigh beam. The operator then again momentarily moves the other weigh beam downwardly to close switch 11 and thus position a receptacle on the other platform. After thus positioning receptacles on both platforms, the operator may again close switch 11a.

At the proper time the switch contacts 26a and 26b are closed by the movement of the conveyor. When this happens, current is delivered to the resistance 117 and to the resitance 116. Since switch 112 is open, the air valve 104a is actuated and the receptacle positioning motor 17 is again actuated. The motor 17 then operates to move another receptacle into filling position on the platform. This forces the first receptacle onto conveyor 4 and closes switch 118. This causes energization of the bucket opening solenoid 10a and feed solenoid 12 for the other bucket. When the other bucket is full, the switch 11 is energized. After the second receptacle has been delivered to the first platform and the feed to the other bucket has been completed, the operator may then release the weigh beam associated with that platform and since the feed to the other bucket has been completed, the weigh beam has moved downwardly to close switch 11, and relay 106 is energized, thus opening switches 107 and 108 and closing switches 109 and 110. When the conveyor has moved through its proper distance, the switch contact 26a will close, resulting in passage of current through the resistance 116 to the air valve 104. This causes upward movement of the receptacle retaining structure 18 followed by inward movement of the receptacle loading pusher bar 16 and a receptacle is moved onto the right-hand platform as viewed in FIGURE 2. The receptacle previously positioned on the platform is moved outwardly onto the unloading or exit conveyor, thus closing switch 119 and the bucket opening solenoid 10 is thus conditioned to release the mass of material in the bucket. At the same time relay 121 is energized through the normally closed switch 123, energization of relay 121 closes switch 124, thus passing current to the solenoid 12a and commencing the feeding operation for the first bucket or the bucket associated with the left-hand platform in FIGURE 2.

When the bucket at the right-hand side has dumped its load, switch 11 will open due to upward movement of the bucket and air valve 104 will close causing retraction of its associated motor 17 and retraction of the motor 17a.

When the other bucket has received its load, switch 11a associated with its scale beam will close resulting in energization of relay coil 106a. This closes the switch contacts 114 and shorts out the relay 121, thus opening switch 124 and stopping the feed to the bucket. The current from switch 114 is then merely consumed by the resistance 121a.

When the conveyor cam switch 26a again closes, a new receptacle will be moved into position through energization of the air valve 104a and movement of the fluid motor 17. Movement of the previously positioned receptacle closes switch 118, thus conditioning the solenoid 10a for release of the bucket closure. When the solenoid 10a is energized, relay 120 is energized, thus closing switch 123 and the solenoid 12 is energized thus commencing the feed in the other bucket (at the right-hand side of the station).

The sequential feed of material into each of the buckets associated with the station will thus continue indefinitely as long as the conveyor 4 continues in operation and as long as the station switch 105 is closed.

In lieu of holding one weigh beam down for two receptacle loading cycles, as above described, the operator may position an empty receptacle on each of the station platforms before closing the start and stop switches 102 and 105. As this is done, the operator need only hold one weigh beam down for one receptacle loading cycle after which time the machine will automatically load the receptacles onto the platforms, fill and pack the receptacles and move them on the discharge conveyor 4.

From the foregoing it will be seen that movement of the receptacle into and out of the filling station is dependent upon the speed of movement of the conveyor belt and the filling of the bucket above the receptacles. The speed of the weighing cycle is independent of the speed of the conveyor but the number of cycles performed by the weighing mechanism per unit time is dependent upon the speed of the conveyor as regulated by the conveyor cam switch 26. The fluid motors of the receptacle handling mechanism are actuated in response to the closure of the magnetic mercury switch associated with the scale beam and bucket and in response to closure of the conveyor cam switch. A timing switch assembly 22, shown in FIGURE 4, is associated with the conveyor drive and is adapted to make and break a pair of contacts 26a and 26b (FIGURE 18), periodically in timed sequential relation to the speed of movement of the conveyors 3 and 4. The switch 22 may include, for example, a cam 23 which is rotated by a driven sprocket and transmission 24 leading from the conveyor drive chain 25, to thus make and break the switch contacts 26a and 26b periodically in relation to the speed of movement of the conveyors.

Cam actuated switches for making and breaking switch contacts for a predetermined number of revolutions of a shaft are well known and the details of the particular cam switch employed, in itself forms no part of the present invention.

The opening of the buckets and, consequently, the filling of the receptacles is dependent upon the speed of movement of the conveyor belt, the movement of the receptacle into and out of filling position, and the presence of a full load in the bucket. The bucket can only be dumped when the bucket has the predetermined load therein to cause closure of the magnetic mercury switch 11a or 11 as the case may be, and after the switch contacts 118 or 119 are closed in response to movement of the receptacles.

Dumping of both buckets simultaneously is prevented by the interlocking relation of the circuits through the switches 107, 109, 111 and 113, which lead to the bucket opening solenoids 10 and 10a. If both buckets are full at the same time, both of the switches 11 and 11a are closed and the circuits to the bucket opening solenoids 10 and 10a are open.

In order to insure that the receptacle handling motors go through a complete cycle when the start-stop switch is opened, a holding relay 102a is provided to bypass the start-stop switch 102. This insures that current is supplied to the unit component circuit after the switch 102 has been opened, until the conveyor cam switch 26 is opened.

When more than one unit is employed, the same conveyor switch 26 may regulate each unit component circuit. Thus, if six units are employed, six receptacles will be delivered simultaneously to the delivery conveyor 4. If desired, a separate cam switch 26 can be provided for each unit, with all of the switches inter-related to cause delivery from the units in a predetermined, selected timed sequence.

Whereas I have shown and descrbied an operative form of my invention, it should be understood that this showing and description thereof is to be taken in an illustrative or diagrammatical sense only. There are many modifications of the invention which will be apparent to those skilled in the art and which will fall within the scope and spirit of the invention. The scope of the invention should be limited only by the scope of the hereinafter appended claims.

The use and operation of the invention are summarized as follows:

The invention contemplates the use of a pair of endless belt conveyors in continuous movement and a plurality of receptacle filling stations or units positioned between these conveyors. The operation of each of the filling units is related to the speed of movement of the discharge conveyor. Any number of filling units may be employed between the conveyors and in any given installation of filling units and conveyors, any selected number of the filling units may be employed at one time. Hence, the machine is operative over a wide range of capacities. In the case of six filling units, as is illustrated in FIGURE 2, the machine may operate by using only one filling unit, in which case the output of the machine will be two filled receptacles per unit time. On the other hand, the machine illustrated in FIGURE 2 may be employed to deliver as many as twelve filled receptacles in that same unit of time.

In selecting the number of units to be used, and, consequently, selecting the capacity of the machine over any given period of operation, the operator need only close the start-stop switch 105 for each unit desired in operation and initiate operation of the unit in the manner previously described.

A particularly advantageous feature of the invention resides in the receptacle loading mechanism for each of the units and the loading conveyor. The loading conveyor 3 is continuously operated and the result is a constant positioning of empty receptacles along the length of the conveyor 3 illustrated in FIGURE 1. Since the loading conveyor is continuously operated, receptacles will be positioned along the entire length of this conveyor. Just as soon as the loading mechanisms 6 are operated to push a number of receptacles into the filling unit 2, the loading conveyor will move the remaining receptacles to the right, as illustrated in FIGURE 1, and a new group of receptacles will flow from the entry chute onto the conveyor 3 to thus fill the space on the conveyor 3 with receptacles.

The receptacle loading structure performs not only the function of pushing receptacles from the loading conveyor 3 into the filling unit but also provides the force required to move receptacles from the filling unit onto the exit or discharge conveyor 4. When the magnetic face 37a of the pusher structure contacts a metallic receptacle positioned on the conveyor 3, and moves it forwardly into the filling unit, this receptacle will contact a receptacle positioned on the ledges 30 and 31 and force the filled receptacle onto the exit conveyor 4. After the new receptacle is positioned on the ledges 30 and 31, the retaining structure 18 moves downwardly and the rim 18a fits within the upper portion of the receptacle thus loosely constraining the receptacle on the platform 14. During the course of the downward movement of the retaining structure 18, the ledges 30 and 31 move downwardly away from the bottom of the receptacle and thus deposit the receptacle on the continuously vibrating platform 14.

The particular vibrating mechanism, for the receptacle supporting platform is highly advantageous. Only a single drive motor is needed to continuously vibrate each of the platforms in the system. Since the platforms are continuously vibrated at all times, the receptacles will continuously vibrate as long as they are positioned on the platforms with the result that a maximum amount of vibrating time is used with each receptacle filled. This results in a thorough packing of the receptacles, with the attendant result that smaller receptacles can be used for a given weight of material delivered.

In the case of granular material, such as coffee, a fast and efficient flow of material to the weighing mechanism is provided by the vibrated feed chute assembly, illustrated in detail in FIGURES 12 through 17. These feed chutes are vibrated at their lower ends in directions normal to the axes of the feed chutes, whenever the clam shell closures for the chutes are opened. It should be understood that granular material is continuously supplied to the feed chutes with the result that a mass of material is present in the chute 13a or 13b prior to the time that the clam shell closure is open and prior to the time that the chute is vibrating. The vibrating motion imparted to the chutes insures a fast and efficient discharge for the material from the chutes 13a and 13b and into the weigh buckets of the weighing mechanism.

The use of the dual mechanisms at each station as herein described, provides the advantage of utilizing space to the maximum. The use of these dual weighing mechanisms enables one receptacle at each unit to be filled while a mass of material is being weighed at the same unit. At the same time, this arrangement assures that the receptacles moved out of the filling unit and onto the discharge conveyor are adequately spaced from one another. With the use of the dual weighing mechanisms the machine may be operated at such speed that a series of filled receptacles may be moved outwardly onto the discharge conveyor 4, just as soon as the previously positioned series of receptacles has moved past the last or right-hand unit 2, illustrated in FIGURE 2. The net result is what amounts to a continuous flow of filled and thoroughly packed receptacles from the discharge conveyor 4.

I claim:

1. A receptacle filling and conveying system, including a pair of conveyors adapted for continuous movement along generally parallel paths, a plurality of receptacle filling units between said conveyors, each such unit having at least one receptacle supporting vibratory platform associated therewith, means for vibrating said platform, and a weighing mechanism for delivering a predetermined mass of material to a receptacle on said platform, and means for moving a receptacle from one conveyor onto said platform while at the same time moving a receptacle from said platform onto the other conveyor.

2. The structure of claim 1, wherein each unit includes a pair of receptacle supporting platforms and a pair of weighing mechanisms associated with said platform, and means for dumping one of the weighing mechanisms for delivering material to a receptacle while at the same time feeding a batch of material to the other weighing mechanism.

3. The structure of claim 1 wherein said receptacle moving means operates periodically in response to movement of said last named conveyor.

4. The structure of claim 1 wherein said receptacle moving means operates in predetermined timed sequence in response to movement of said last named conveyor and independent of movement of said first named conveyor.

5. The structure of claim 1 characterized by and including means for preventing delivery of material from one weighing mechanism to a receptacle on its associated platform while the other weighing mechanism is delivering material to a receptacle on its associated platform.

6. An automatic receptacle filling and conveying system, including at least one filling unit and conveying means for moving a receptacle into and out of said filling unit, a pair of receptacle supporting platforms associated with said unit and a material weighing and feeding mechanism associated with each said platform, receptacle positioning means for each of the receptacle supporting platforms, each receptacle positioning means being movable from a first position in which is clears the conveying means into a second position in which it locates a receptacle on the receptacle supporting platform, retraction means for returning said receptacle positioning means to its first position in which it clears the conveying means, electrical means for actuating each said weighing mechanism to thereby deliver material to receptacles supported on each said platform, said electrical means including means for preventing simultaneous delivery of material from each of said weighing mechanisms.

7. A receptacle filling and conveying system including at least one filling unit positioned between a loading conveyor and an unloading conveyor, said conveyors being adapted for continuous movement, a pair of receptacle supporting platforms associated with said unit and a material weighing mechanism associated with each said platform, each weighing mechanism being adapted to weigh a preselected mass of material and deliver said mass to a receptacle on its associated platform, means for moving a receptacle from said loading conveyor onto said platform and at the same time moving a receptacle from said platform and onto said unloading conveyor, said receptacle moving means further including retraction means for returning said positioning means to an inoperative position whereby it clears the delivery conveyor, and means operative in response to a predetermined movement of said unloading conveyor for initiating flow of material from one weighing mechanism to its associated receptacle while at the same time initiating the flow of material to the other weighing mechanism.

8. A receptacle filling and conveying system including at least one filling unit positioned between a loading conveyor and an unloading conveyor, said conveyors being adapted for continuous movement, a pair of receptacle supporting platforms associated with said unit and a material weighing mechanism associated with each said platform, each weighing mechanism being adapted to weigh a preselected mass of material and deliver said mass to a receptacle on its associated platform, means for moving a receptacle from said loading conveyor onto said platform and at the same time moving a receptacle onto said unloading conveyor, and means operative in response to movement of a receptacle from one of said platforms to said unloading conveyor and a predetermined movement of said unloading conveyor for initiating the flow of material to the other weighing mechanism.

9. The structure of claim 8 characterized by and including means for preventing simultaneous delivery of material from both weighing mechanisms to receptacles on both platforms.

10. A receptacle filling and conveying system including a delivery conveyor and a discharge conveyor adapted for continuous movement along generally parallel paths, at least one receptacle filling unit having a receptacle supporting platform between said conveyors, a weighing mechanism for delivering a pre-determined mass of material to a receptacle on said platform, and receptacle positioning means operable, when moved from a first position in which no obstruction is provided to the movement of receptables along the delivery conveyor, to move a receptacle from the delivery conveyor onto said platform, and at the same time to move another receptacle from said platform onto the discharge conveyor, said receptacle positioning means further including retraction means for returning said positioning means to its first position during delivery of material to a receptacle on the supporting platform to thereby clear the delivery conveyor.

11. A receptacle filling and conveying system, including at least one filling unit and conveying means adapted to move a receptacle into and out of said filling unit, a pair of receptacle supporting platforms associated with said unit and a material weighing mechanism associated with each said platform, receptacle positioning means for each of the receptacle supporting platforms, each receptacle positioning means being movable from a first position in which it clears the conveying means into a second position in which it locates a receptacle on the receptacle supporting platform, retraction means for returning said receptacle positioning means to its first position in which it clears the conveying means during operation of the material weighing mechanism, each weighing mechanism being adapted to weight a preselected mass of material and deliver said mass to a receptacle on its associated platform, means for initiating a flow of material from the other weighing mechanism, and means for initiating flow of material from the weigh mechanism to the receptacle upon movement of said receptacle onto the platform.

12. The structure of claim 11 characterized by and including an electrical circuit for controlling the unloading of each weighing mechanism, means to close each such circuit upon delivery of a preselected load to the weighing mechanism, the circuits of each unit including interlocked portions adapted to break each circuit when both weighing mechanisms hold a preselected load simultaneously.

13. The structure of claim 11 characterized by and including an electrical circuit for controlling the dumping of a preselected load from each weighing mechanism, and switch means operative in response to movement of a receptacle out of said filling unit for completing the circuit associated with the dumping control for the weigh mechanism associated with that platform.

14. The structure of claim 11 characterized by and including electrical means for initiating the flow of material to each weigh mechanism, each such electrical mechanism being responsive to the dumping of a preselected load from the other mechanism before initiating the flow of material in its associated weigh mechanism.

References Cited by the Examiner

UNITED STATES PATENTS

| | | | |
|---|---|---|---|
| 1,262,256 | 4/1918 | Redd | 177—52 |
| 1,751,487 | 3/1930 | McIntyre | 177—52 |
| 1,881,859 | 10/1932 | Mullendore | 177—56 |
| 2,319,908 | 5/1943 | Walter | 177—57 |
| 2,613,053 | 10/1952 | Dorrington | 177—59 |
| 2,669,412 | 2/1954 | Nowak | 177—90 |
| 2,787,436 | 4/1957 | Reynolds | 177—123 |

LEO SMILOW, *Primary Examiner.*